(12) United States Patent
Smith et al.

(10) Patent No.: US 8,019,002 B2
(45) Date of Patent: Sep. 13, 2011

(54) PARALLEL BATCH DECODING OF VIDEO BLOCKS

(75) Inventors: Jayson Smith, San Diego, CA (US); Aravind Bhaskara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1339 days.

(21) Appl. No.: 11/450,622

(22) Filed: Jun. 8, 2006

(65) Prior Publication Data

US 2007/0286288 A1 Dec. 13, 2007

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.25
(58) Field of Classification Search .................. None
See application file for complete search history.

(56) References Cited

U.S. PATENT DOCUMENTS

| | | | |
|---|---|---|---|
| 5,852,630 A | 12/1998 | Langberg et al. | |
| 6,267,061 B1* | 7/2001 | Katzer | 105/1.5 |
| 2003/0066056 A1* | 4/2003 | Petersen et al. | 717/137 |
| 2006/0067399 A1 | 3/2006 | Zhang | |

FOREIGN PATENT DOCUMENTS

KR 1020060028847 4/2006

OTHER PUBLICATIONS

Bhatia, T.: "Optimization of H.264 High Profile Decoder for Pentium 4 Processor" M, SC Thesis, Online, Dec. 2005, pp. I-XII-1-81, XP002454824.

Bilas, A. et al.: "Real-Time Parallel MPEG-2 Decoding in Software" Parallel Processing Symposium, 1997. Proceedings., ILTH International Geneva, Switzerland Apr. 1-5, 1997, pp. 197-203, XP010216782.

Chen-Han, T. et al.: "Algorithm and Architecture Optimization for Full-mode Encoding of H.264/AVC Intra Prediction" Circuits and Systems, 2005. 48th Midwest symposium on Cincinnati, Ohio Aug. 7-10, 2005, Piscataway, NJ, USA, IEEE, Aug. 7, 2005, pp. 47-50 XP010893524.

De With, P.H.N. et al.: "On the Design of Multimedia Software and Future System Architectures" Proceedings of the SPIE conference on embedded processors for multimedia and communications, San Jose, CA, USA Jan. 19-20, 2004, vol. 5309, No. 1, Jan. 19, 2004, pp. 58-69, XP002454823.

(Continued)

*Primary Examiner* — Nhon T Diep
(74) *Attorney, Agent, or Firm* — Kevin T. Cheatham

(57) ABSTRACT

The disclosure describes video decoding techniques that utilize parallel processor technology in order to accelerate the decoding processes of image frames. The techniques include defining batches of video blocks to be decoded in parallel with one another. According to this disclosure, a method may comprise defining a first batch of video blocks of an image frame, decoding the first batch of video blocks in a serial manner, defining a second batch of video blocks and a third batch of video blocks relative to the first batch of video blocks, and decoding the second and third batches of video blocks in parallel with one another.

30 Claims, 14 Drawing Sheets

OTHER PUBLICATIONS

Jamil-Ur-Rehman, et al.: "Fast Intra Prediction Mode Decision Using Parallel Processing" Proceedings of 2005 International Conference on Machine and Cybernetics, Guangzhou, China, Aug. 18-21, 2005, Piscataway, NJ, USA, IEEE, Aug. 18, 2005, pp. 5094-5098, XP010847681.

Li, E et al.: "Implementation of H.264 Encoder on General-Purpose Processors with Hyper-Threading Technology" Proceedings of the SPIE Conference on Visual Communications and Image Processing 2004, San Jose, CA, USA, Jan. 20-22, 2004, vol. 5308, No. 1, Jan. 20, 2004, pp. 384-395, XP002454822.

Van Der Tol, E. et al.: "Mapping of H.264 Decoding on a multiprocessor architecture" Proceedings of the SPIE Conference on Image and Video communications and processing 2003, Santa Clara, CA, USA, Jan. 21-24, 2003, pp. 707-718, XP008025096.

Ahmad Ishfaq, "Video Compression With Parallel Processing," Parallel Computing, Elsevier Publishers, Amsterdam, NL, vol. 28, No. 7-8, Aug. 2002, pp. 1039-1078.

PCT Search Report, Sep. 13, 2007.

Kleiman, Shah, Smaalders (1996) "Programming with Threads." Prentice Hall, 1996 ISBN: 0-13-172389-8.

Written Opinion—PCT/US2007/061177, International Search Authority, European Patent Office, Sep. 13, 2007.

* cited by examiner

☐ ENCODED VIDEO BLOCK

☒ DECODED VIDEO BLOCK

▨ VIDEO BLOCK IN THE CURRENT BATCH

☐ ENCODED VIDEO BLOCK

☒ DECODED VIDEO BLOCK

▨ VIDEO BLOCK IN THE CURRENT BATCH

ENCODED VIDEO BLOCK
DECODED VIDEO BLOCK
VIDEO BLOCK IN THE CURRENT BATCH

ENCODED VIDEO BLOCK
DECODED VIDEO BLOCK
VIDEO BLOCK IN THE CURRENT BATCH

421  □ ENCODED VIDEO BLOCK
⊠ DECODED VIDEO BLOCK
▨ VIDEO BLOCK IN THE CURRENT BATCH

□ ENCODED VIDEO BLOCK
⊠ DECODED VIDEO BLOCK
▨ VIDEO BLOCK IN THE CURRENT BATCH

PARALLEL BATCH DECODING OF VIDEO BLOCKS

RELATED APPLICATIONS

This application is related to co-pending application Ser. No. 11/340,378, filed on Jan. 25, 2006, entitled "PARALLEL DECODING OF INTRA-ENCODED VIDEO."

TECHNICAL FIELD

This disclosure relates to digital video processing and, more particularly, decoding techniques for image frames defined by a plurality of video blocks.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, direct two-way communication devices (sometimes referred to as "walkie-talkies"), and the like. Radiotelephones and other communication devices may utilize digital video to support video telephony (VT) and video teleconferencing features.

A number of different video coding standards have been established for coding digital video sequences. The Moving Picture Experts Group (MPEG), for example, has developed a number of standards including MPEG-1, MPEG-2 and MPEG-4. Other video coding standards include the ITU H.263 and ITU H.264 standards developed by the International Telecommunications Union (ITU). In addition, many proprietary video coding standards have also been developed by individual companies, and new proprietary and non-proprietary standards continue to emerge.

Video coding standards generally facilitate the coding of image frames of a video sequence in a manner that compresses the amount of data needed for the image frames. In compliance with the MPEG standards and/or the ITU H.263 and ITU H.264 standards, for example, the coding techniques may utilize similarities between successive video frames, referred to as temporal or inter-frame correlation, in order to achieve inter-frame compression. In addition, video coding techniques may utilize similarities within frames, referred to as spatial or intra-frame correlation, to compress the video frames.

For intra-coding and inter-coding, a video encoder/decoder (CODEC) may operate on blocks of pixels within image frames that define a video sequence. In the MPEG-4 standard, for example, the encoder typically divides a video frame to be transmitted into "macroblocks," which comprise 16 by 16 pixel arrays. MPEG-4 may also allow for sub-division of the macroblocks into 8 by 8 video blocks. As another example, the ITU H.264 standard supports 16 by 16 video blocks (macroblocks), and allows sub-division into 16 by 8 video blocks, 8 by 16 video blocks, 8 by 8 video blocks, 8 by 4 video blocks, 4 by 8 video blocks and 4 by 4 video blocks.

For inter-coding of a given video block, a CODEC searches similarly sized video blocks of one or more immediately preceding video frames (or subsequent frames) in order to identify the most similar video block, sometimes referred to as the "best prediction." The process of comparing a current video block to video blocks of other frames is typically referred to as motion estimation. Once a "best prediction" is identified for a video block, the encoder can encode the differences between the current video block and the best prediction via a process referred to as motion compensation. Motion compensation comprises a process of creating a difference block, indicative of the differences between the current video block to be encoded and the best prediction. Motion compensation typically involves fetching the best prediction block using a motion vector, and then subtracting the best prediction from an input block to generate a difference block.

For intra-frame compression, the process of comparing the current video block to other video blocks of the same video frame is typically referred to as intra-prediction (typically spatial estimation or frequency domain estimation). An intra-coding process typically refers to the process of creating a difference block for intra-coded video based on a best prediction found via spatial estimation or frequency domain estimation. Thus, intra-prediction and intra-coding are generally processes for intra-frame compression that are analogous to motion estimation and motion compensation of inter-frame compression.

After motion compensation or intra-coding has created the difference block, a series of additional encoding steps are typically performed to encode and compress the difference block even further. These additional encoding steps may depend on the encoding standard being used. For example, the additional encoding steps may include an 8×8 discrete cosine transform, followed by scalar quantization, followed by a raster-to-zigzag reordering, followed by run-length encoding, followed by Huffman encoding. De-block filtering may also be performed in order to remove blockiness artifacts that can manifest between video blocks of an image frame.

SUMMARY

This disclosure describes video decoding techniques that utilize parallel processing technology in order to accelerate the decoding processes of image frames. The techniques may be used in devices that have multiple processors, or in devices that utilize a single processor that supports multiple parallel threads. The techniques include defining batches of video blocks to be decoded. In accordance with this disclosure, one or more of the defined batches can be decoded in parallel with one another.

In particular, each batch of video blocks is delivered to one of the processors or one of the threads of a multi-threaded processor. Each batch of video blocks is decoded serially by the respective processor or thread. However, the decoding of two or more batches may be performed in parallel with the decoding of other batches. In this manner, decoding of an image frame can be accelerated insofar as different video blocks of an image frame are decoded in parallel with other video blocks. The techniques of this disclosure are configured to ensure that all necessary information is available for the decoding of the video blocks, which can be challenging, particularly for intra-coded blocks.

In one embodiment, this disclosure provides a method comprising defining a first batch of video blocks of an image frame, decoding the first batch of video blocks in a serial manner, defining a second batch of video blocks and a third batch of video blocks relative to the first batch of video blocks, and decoding the second and third batches of video blocks in parallel with one another.

If implemented in software, the techniques of this disclosure may be embodied on a computer-readable medium. In that case, the computer-readable medium comprises instructions that upon execution in a video coding device cause the device to define a first batch of video blocks of an image frame, decode the first batch of video blocks in a serial manner, define a second batch of video blocks and a third batch of video blocks relative to the first batch of video blocks, and decode the second and third batches of video blocks in parallel with one another.

In another embodiment, this disclosure provides a device comprising a decode control unit that defines a first batch of video blocks of an image frame, and defines second and third batches of video blocks relative to the first batch of video blocks, and one or more processors that decode the first batch of video blocks in serial manner and decode the second and third batches of video blocks in parallel with one another.

In another embodiment, this disclosure provides a device that decodes image frames of a video sequence, wherein the device defines a first batch of video blocks of an image frame, decodes the first batch of video blocks in a serial manner, defines a second batch of video blocks and a third batch of video blocks relative to the first batch of video blocks, and decodes the second and third batches of video blocks in parallel with one another.

In another embodiment, this disclosure provides a device comprising means for defining a first batch of video blocks of an image frame, means for decoding the first batch of video blocks in a serial manner, means for defining a second batch of video blocks and a third batch of video blocks relative to the first batch of video blocks, and means for decoding the second and third batches of video blocks in parallel with one another.

Additional details of various embodiments are set forth in the accompanying drawings and the description below. Other features, objects and advantages will become apparent from the description and drawings, and from the claims.

DETAILED DESCRIPTION

Figure 1:
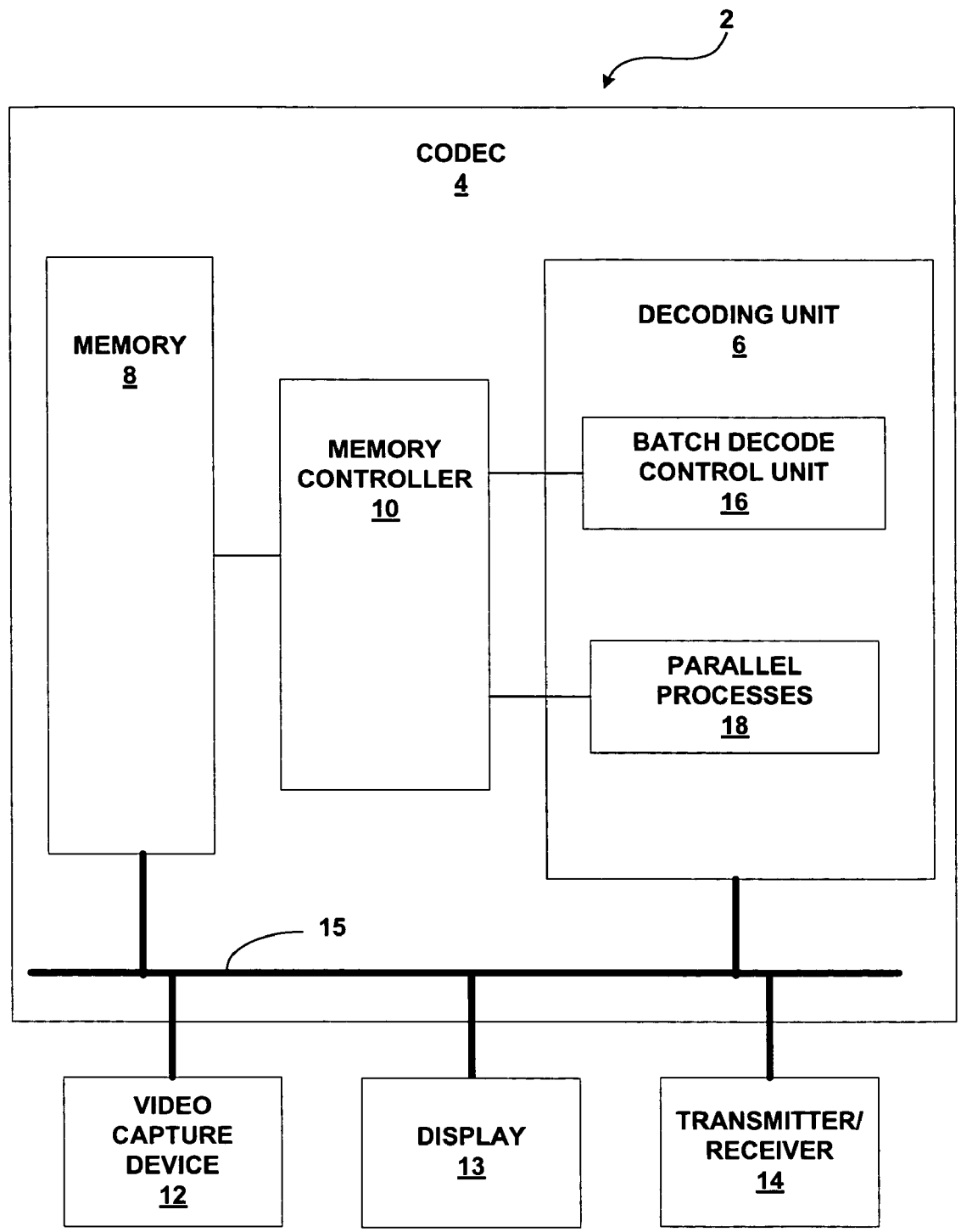
FIG. 1 is an exemplary block diagram of a video coding device according to an embodiment of this disclosure.

This disclosure describes video decoding techniques that utilize parallel processes to accelerate the decoding of image frames. The techniques involve defining batches of video blocks of an image frame for processing. Various batches can be decoded in parallel with other batches. The parallel decoding processes may be executed by multiple processors, different threads executed by a multi-threaded processor, or a combination of both. In this manner, batch of video blocks is handled by a parallel process, i.e., one of a set of parallel processors or one of a set of threads of a multi-threaded processor. Each batch of video blocks is decoded serially by the respective process, i.e., the respective processor or thread. The decoding of two or more different batches, however, can be performed in parallel with the decoding of other batches. In this manner, decoding of an image frame can be accelerated relative to decoding techniques that rely on a single processor to process video blocks in a serial mode.

The techniques of this disclosure are configured to ensure that all necessary information is available for the decoding of the video blocks. In particular, batches are specifically defined in a manner that ensures that all necessary information is available for the decoding of the video blocks. Since video blocks may be encoded differently (e.g., intra-coded or inter-coded), the process of defining batches should ensure that each video block can be decoded regardless of the type of video block and how it was encoded. To do this, attention must be given to other video blocks of the frame relative to the blocks of a batch. In general, new batches are defined whenever a process (a thread or a processor) becomes available for decode and all necessary information is present for a batch of video blocks to be serially decoded.

Intra-coded video blocks, for example, have intra-frame dependency, and typically depend on one of a subset of video blocks that are adjacent to the intra-coded block. Moreover, for standards such as MPEG-4, ITU H.263 and ITU H.264, the intra-frame dependency is typically defined only with respect to previously coded blocks that are above the current video block or located to the left of the current video block within the spatial arrangement of the frame. In order to decode video blocks that have such intra-frame dependency, it may be essential that the adjacent video blocks used for intra-coding of the current video block are decoded prior to decoding the current video block. In accordance with this disclosure, batches of video blocks can be defined in a way that ensures that every possible video block dependency of a given video block is accounted for at the time the given video block is to be decoded.

Once a first batch has been decoded, two new batches (second and third batches) can be defined while still ensuring that every possible video block dependency is taken into account. Once the second and third batches have been decoded, three new batches (fourth, fifth and sixth batches) can be defined. Once the forth, fifth and sixth batches have been decoded, up to four additional batches can be defined, and so forth. The process may continue by building up multiple parallel batches for multiple processors or threads. As the process nears the end of a given image frame, however, the process may reduce the number of batches that are processed in parallel. According to this disclosure, the first batch and last batch defined in the decoding process of an image frame may each be decoded at least partially alone, while every other batch of the image frame may be processed in parallel with other batches. The processing efficiency associated with the use of multiple processors (or multiple threads) is gained in the parallel processing of batches.

In the following disclosure, many details are provided in a simplified manner. In particular, many details are described in which a set of batches are defined and then processed, before the next set is defined. In actuality, however, more efficiency can be gained by defining batches asynchronously. That is to say, new batches may be defined for any given processor or thread as soon as that processor or thread becomes available, e.g., once the processor or thread has finished with its current batch. As long as all necessary information is available for the decode of a set of video blocks and a processor or thread is available, the next batch can be defined. For simplicity, however, many details herein illustrate batches being defined synchronously, in sets, for parallel processing. It is preferred, however, to allow each subsequent batch to be defined asynchronously, whenever resources become available.

FIG. 1 is a block diagram of a video coding device 2 according to this disclosure. Coding device 2 may comprise any of a wide variety of devices that can be used to encode or decode video sequences. Examples of coding device 2 generally include any computer, such as a server, a workstation or any other desktop computing device, or a mobile computing device such as a laptop computer or a personal digital assistant (PDA). Other examples include digital television broadcasting satellites and receiving devices such as digital televisions, digital cameras, digital video cameras or other digital recording devices. Furthermore, other examples include digital video telephones such as mobile telephones having video capabilities, direct two-way communication devices with video capabilities, other wireless video devices, and the like.

Coding device 2 includes a CODEC 4 that performs video encoding and video decoding. For purposes of this disclosure, only the video decoding is described. CODEC 4, however, may also include components to facilitate video encoding, such as a motion estimator, a motion compensator, a spatial estimator (or intra-predictor), an intra-coder, difference calculation units, and the like. These components for video encoding, however, are not shown for simplicity in this disclosure.

As shown in FIG. 1, CODEC 4 includes a decoding unit 6, which is coupled to memory 8 via memory controller 10. Memory controller 10 controls memory fetches and loads of video data to decoding unit 6. Encoded image frames of a video sequence are stored in memory 8, and following decode of the image frames, the decoded frames may also be stored in memory 8. Memory 8 generally represents any of a wide variety of possible memory configurations.

Memory 8 may comprise any volatile or non-volatile storage elements. Memory 12 stores video sequences, e.g., during the encoding and decoding processes. In some cases, memory 8 may include both on-chip and off-chip memory. For example, memory 8 may include a relatively large off-chip memory space that stores a video sequence, and a smaller and faster local on-chip memory used in the decoding process. In that case, the off-chip memory may comprise dynamic random access memory (DRAM), or FLASH memory, and a local on-chip memory may comprise synchronous random access memory (SRAM). For simplicity, however, a single memory 8 is illustrated to represent any number of memory elements that can be used to facilitate video coding. In some cases, memory 8 may be organized to define line buffers that allow the memory to be shared for other storage applications device 2, and in this case, memory controller 10 may facilitate such multi-use of memory 8.

CODEC 4 may be coupled to a variety of other components via a system bus 15. In the illustrated example of FIG. 1, device 2 also includes a video capture device 12 such as a digital camera to facilitate the video capture of a sequence of video images. In addition, device 2 may include a display 13 that presents decoded video sequences to a user. Also, device 2 may include a transmitter/receiver 14 that facilitates wireless communication with other devices. In this case, coded video sequences may be transmitted or received via transmitter/receiver 14. Upon receiving an encoded video sequence, for example, the sequence may be stored in memory 8 and decoded by decoding unit 6, and then the decoded video sequence may be presented to a user via display 13.

CODEC 4 generally refers to an encoder, a decoder, or an integrated encoder/decoder. The techniques described herein are most applicable to decoding, but may also apply during encoding particularly if decoding techniques are used as part of the encoding steps. CODEC 4 may be implemented within hardware, software, firmware, one or more digital signal processors (DSPs), microprocessors, application specific integrated circuits (ASICs), field programmable gate arrays (FPGAs), discrete hardware components, or various combinations thereof.

In accordance with this disclosure, decoding unit 6 includes a batch decode control unit 16 and a set of parallel processes 18. Parallel processes 18 generally refer to multiple processors or multiple threads executed by a single processor. In one example, parallel processes 18 refer to a plurality of discrete processors that operate independently of one another. In an alternative example, parallel processes 18 refers to a single processor (such as a DSP) that includes multiple threads. The multiple threads of the DSP may be viewed as virtual processors that can independently handle the decoding of different batches of video bocks parallel.

In accordance with this disclosure, batch decode control unit 16 defines a first batch of video blocks of an image frame, and once the first batch is decoded, defines second and third batches based on the first batch. Parallel processes 18 decode the first batch of video blocks in serial manner and decode the second and third batches of video blocks in parallel with one another. The second and third batches are processed in serial in a given one of parallel processes 18, but the second batch can be processed in parallel with the third batch by different ones of processes 18 (e.g., in different threads of a multi-threaded processor).

Batch decode control unit 16 may then define three more batches (e.g., fourth, fifth and sixth batches) once the first three batches are decoded. Following the decode of the three batches, a set of four batches can be defined. Following the decode of those four batches, a set of five batches can be defined. The size of each batch and the limit on the number of batches that can be decoded simultaneously may be defined by the scheme. Such limitations may be based on the number of processes 18 (e.g., the number of threads), the size of the image frames to be decoded, and other factors. Again, this disclosure provides many details by illustrating batches being defined as synchronous sets. Preferably, however, each respective batch is defined as soon as possible (asynchronously), whenever a processor or thread becomes available. This avoids down-time, e.g., that would occur if batches were defined as synchronous sets and one batch takes much longer to decode than the other batches. Instead, if one batch takes longer to decode (e.g., due to the number of video blocks or the complexity of such block), when the other batches are done decoding, the available processors or threads can immediately decode new batches.

All of the video blocks of a given batch may be contiguous within the image frame, and can be processed serially by a respective one of processes 18. The different batches that are processed in parallel, however, are typically non-contiguous with one another, and usually reside in different rows of the image frame. Each batch may be defined by a column parameter defining a column within the image frame, a row parameter defining a row within the image frame, and a number of contiguous video blocks in the respective batch. This size of the video blocks may also be defined, e.g., 16×16, 8×8, or 4×4, if this is not fixed by the respective standard.

Figure 2:
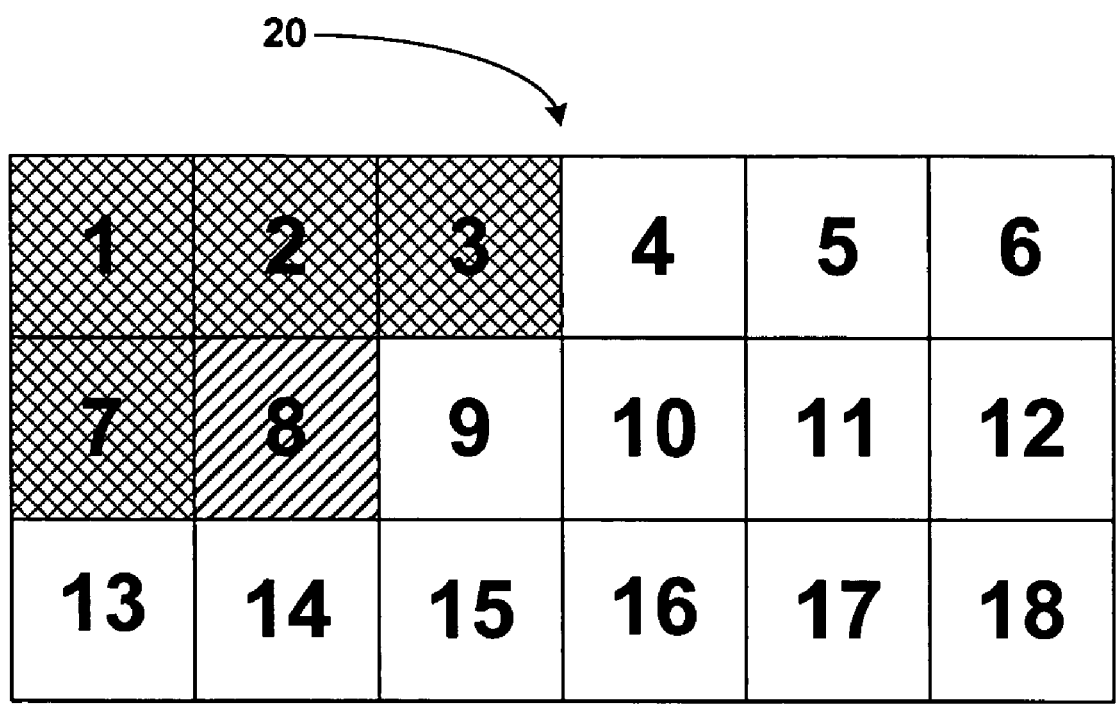
FIG. 2 is a conceptual diagram illustrating a portion of an image frame that includes multiple video blocks.

FIG. 2 is a conceptual diagram illustrating a portion of an image frame 20 that includes multiple video blocks. The different video blocks of the illustrated portion of image frame 20 are labeled 1 to 18. In general, each of these video blocks may comprise a block of pixels and may include multiple sets of data for different pixel values (R, G, B values) or multiple sets of data for chrominance and luminance values. Thus, each video block described herein may actually represent multiple sets of data that defines the visual characteristics of a discrete area of the image frame. Several blocks of data may be used to represent a given video block, such as by using separate blocks of data for chrominance and luminance. The sizes of such data block may vary due to over sampling or under sampling of the chrominance relative to the luminance of a given area defined by the video block. A video block may refer to the data blocks for chrominance and luminance in a given area.

The video blocks are generally processed in a serial fashion from the upper left hand corner of an image frame to the lower right hand corner. In other words, video blocks are typically processed serially from video block 1 to video block 18. This typically works well, since intra-coded blocks may depend upon video blocks that were previously processed in this serial fashion. For example, if video block number 8 of FIG. 2 is intra-coded, it may depend upon video block numbers 1, 2, 3, or 7. If the video blocks are decoded in a serial fashion, when the time comes to decode video block number 8, each of video blocks 1, 2, 3 and 7 would have already been decoded. Therefore, even if video block number 8 is intra-coded, all necessary data should be available for the decode of this video block.

The relationship between video blocks of a frame in the intra-coded context makes it difficult to decode several video blocks at the same time. According to this disclosure, batches of video blocks are defined, which can be processed in parallel. The batches each include contiguous video blocks, but different batches that are processed in parallel may be non-contiguous with one another. Each batch is decoded serially with respect to the video block of that batch, yet in parallel with the video blocks of other batches. Importantly, the first video block of each respective batch is a video block for which all necessary decode information is available, even if the video block is intra-coded. Following the decode of that first video block of each batch, the next video block should have all necessary decode information. Thus, as long as each batch is decoded in serial, the different batches can be decoded simultaneously regardless of the types of video block in the different batches.

Figure 3:
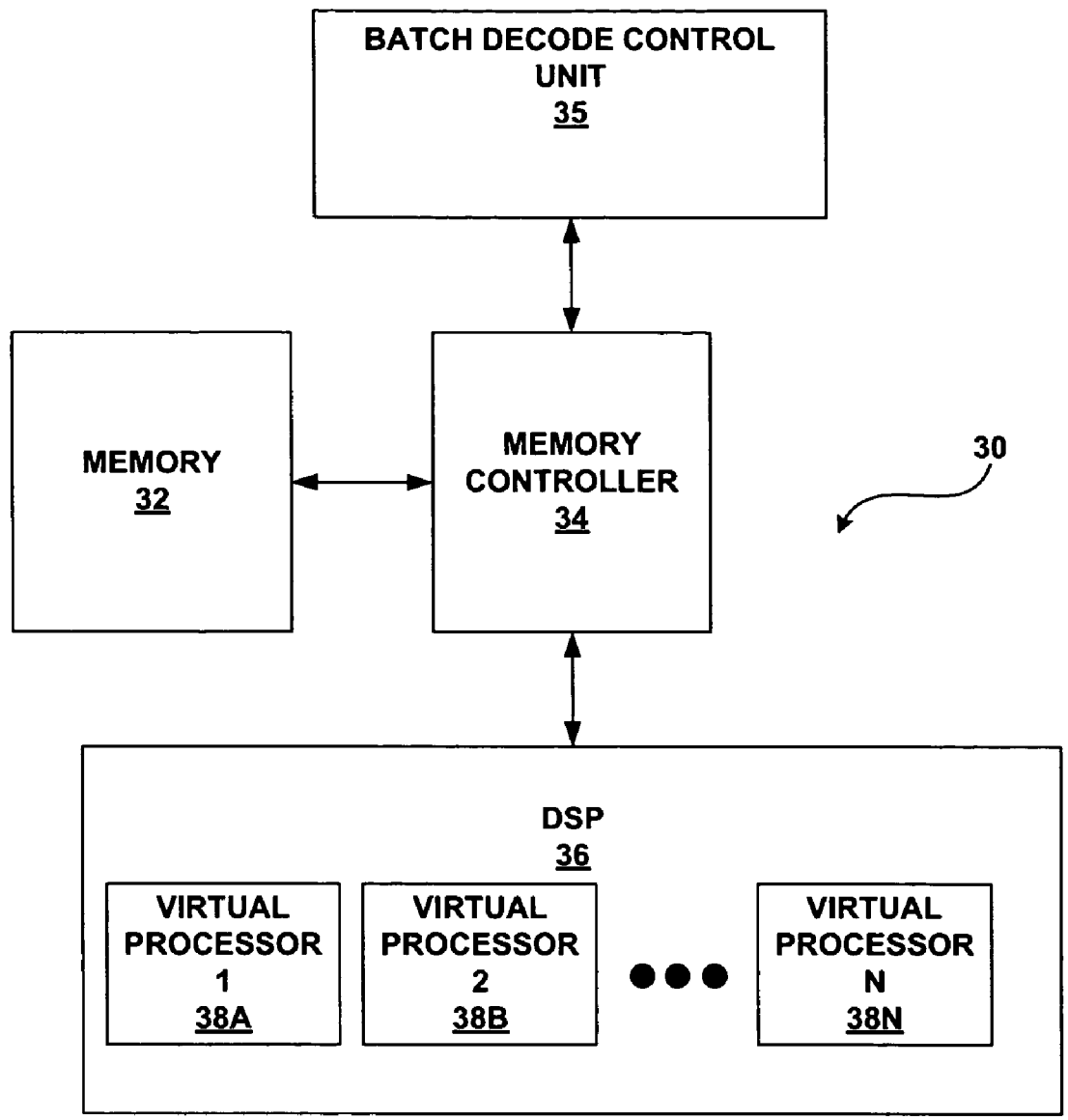
FIG. 3 is a block diagram illustrating some exemplary components of a video coding device according to an embodiment of this disclosure.

FIG. 3 is a conceptual diagram block diagram illustrating some exemplary components of a video coding device 30 according to an embodiment of this disclosure. The illustrated components of device 30 may correspond to those of device 2 of FIG. 1. As shown in FIG. 3, device 30 includes a batch decode control unit 35, a memory 32, a memory controller 34, and a DSP 36 that executes different threads serving as multiple virtual processors 38A-38N. Each of virtual processors 38A-38N may comprise a thread of DSP 36 capable of performing decoding tasks independently of the other threads. Although three virtual processors are illustrated, the number of virtual processors may be larger than three in most embodiments. DSP 36 may include six virtual processors (i.e., six threads), for example.

Batch decode control unit 35 may comprise a microprocessor separate from DSP 36, or possibly hardware, software, firmware or any combination thereof. In any case, batch decode control unit 35 defines batches of video blocks, which may be decoded simultaneously as described herein. Again, the batches each include contiguous video blocks, but different batches that are processed in parallel may be non-contiguous with other batches. A first batch of video blocks may be decoded alone. Second and third batches may defined relative to the first batch, and decoded in parallel. Thereafter, subsequent sets of batches may also include progressively more batches. The different virtual processors 38 process each batch in a serial manner. However, the processing in the different virtual processors 38 can occur simultaneously. As long as each batch is decoded in serial, the different batches can be decoded simultaneously by different ones of virtual processors 38. The batches may be processed as sets (synchronously), but more preferably, new batches are defined anytime one of virtual processors 38 finishes it current batch. As long as the necessary information is available to define a batch of video blocks that can be decoded, and a virtual processor is available, a batch for that processor should be defined to avoid down time.

The size of each batch and the limit on the number of batches at any given time may be defined by batch decode control unit 35 based on programmed parameters. Such limitations on batches may be based on the number of virtual processors 38 in DSP 36 and the size of the image frames to be decoded, although other factors could also affect batch size, and the limit on the number of batches. Batch decode control unit 35 may define each batch by a column parameter defining a column within the image frame, a row parameter defining a column within the image frame, and a number of contiguous video blocks in the respective batch. The size and shape of the video blocks may also be defined, if such information is not set by the standard.

Parameters that define the minimum number of video blocks in a batch may also be used to ensure that batches are not too small or too large. If batches are too small, the processing overhead associated with defining the batches may outweigh processing gains from the parallel nature of the processing. Also, if batches are allowed to become too large, processing gains may be lost.

Figure 4A:
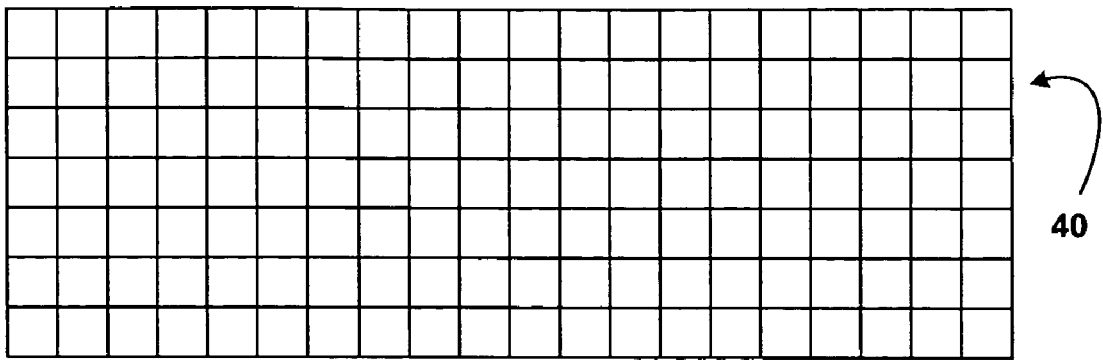
FIGS. 4A-4T are a series of conceptual diagrams illustrating a decoding process that includes defining batches and decoding some of the batches in parallel with one another.
Figure 4B:
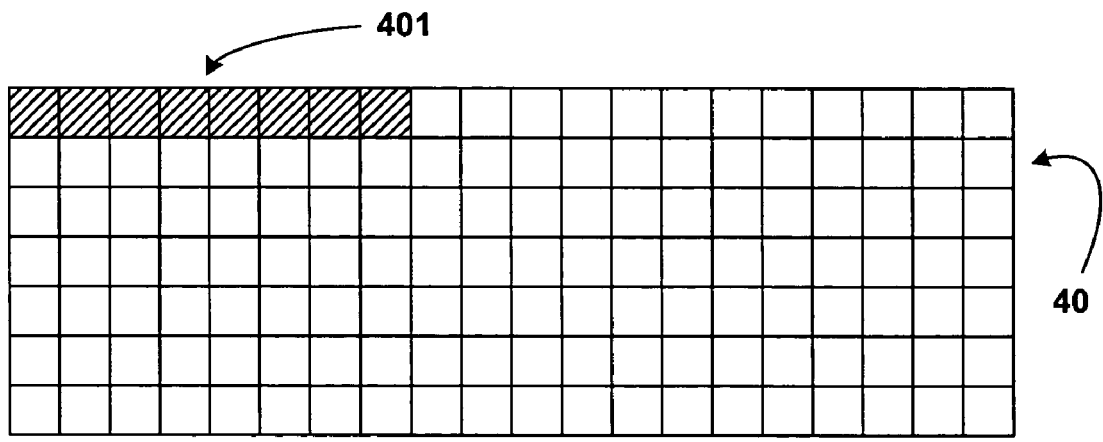
Figure 4C:
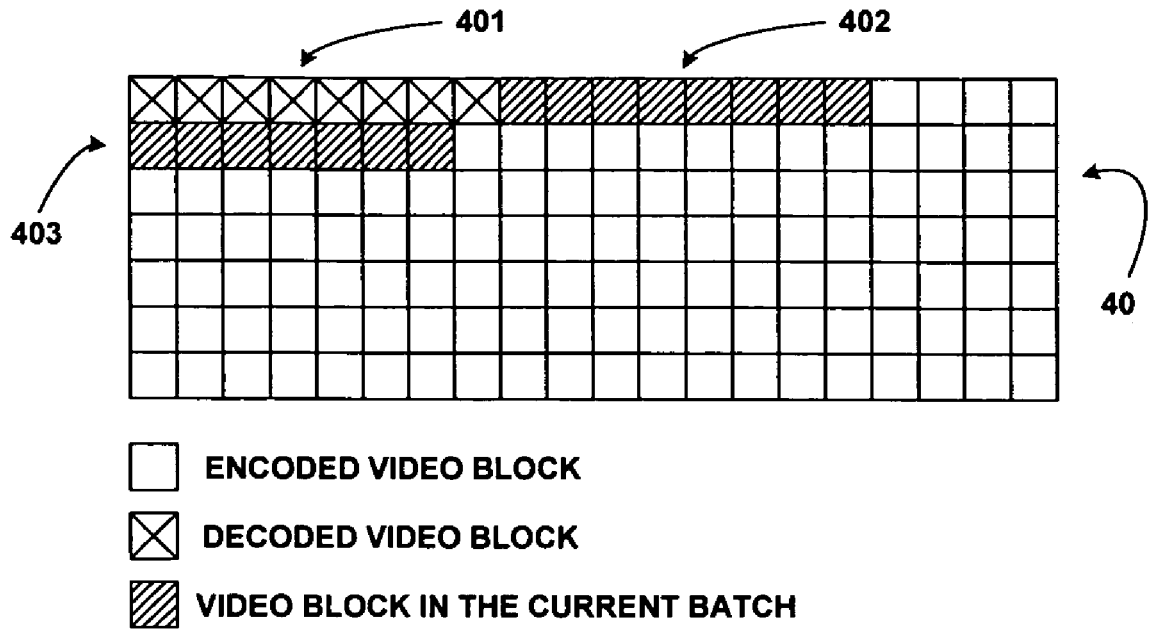
Figure 4D:
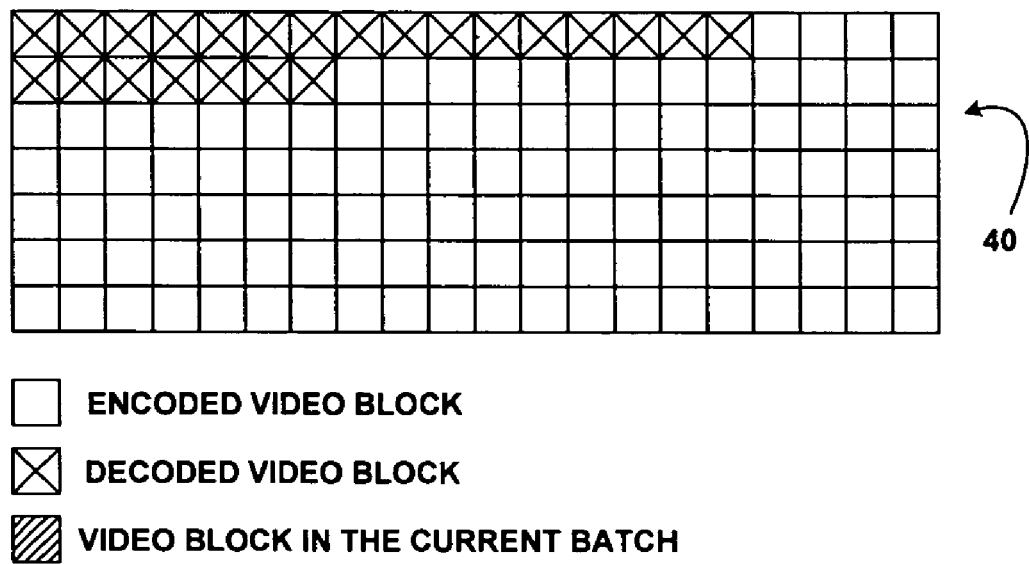
Figure 4E:
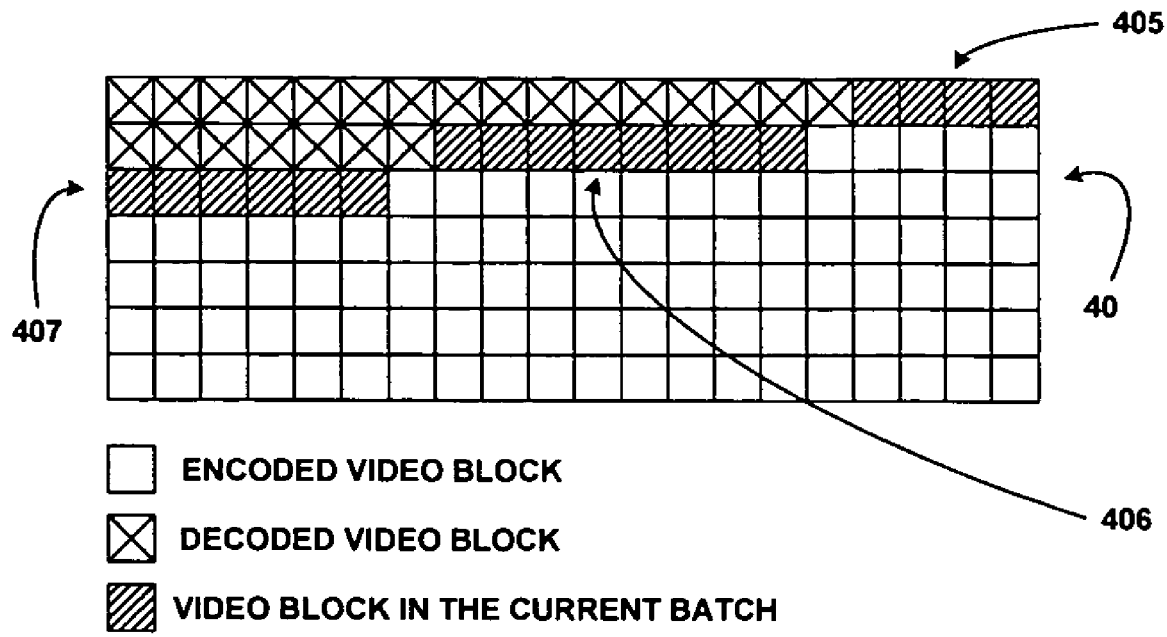
Figure 4F:
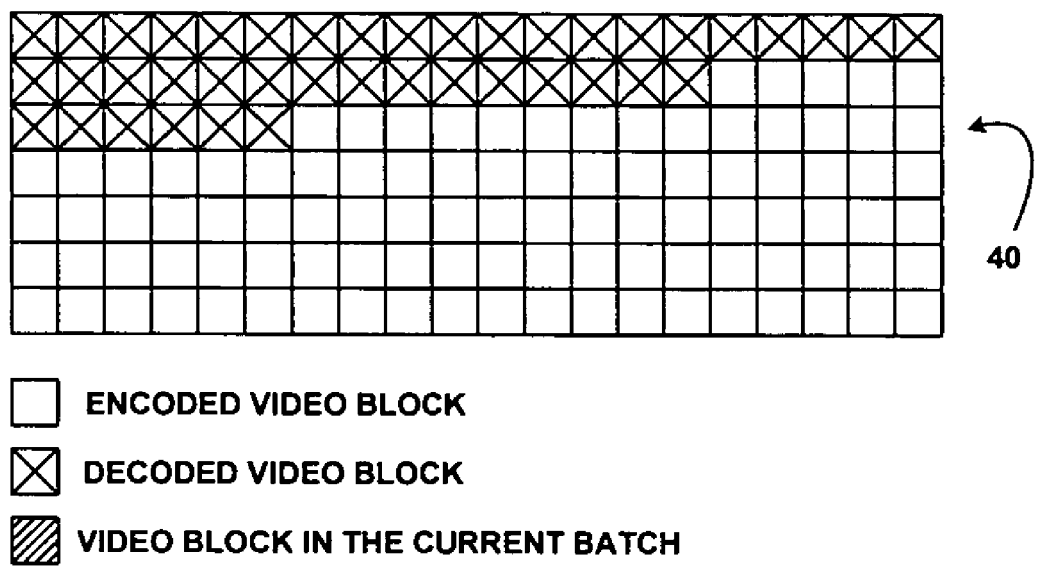
Figure 4G:
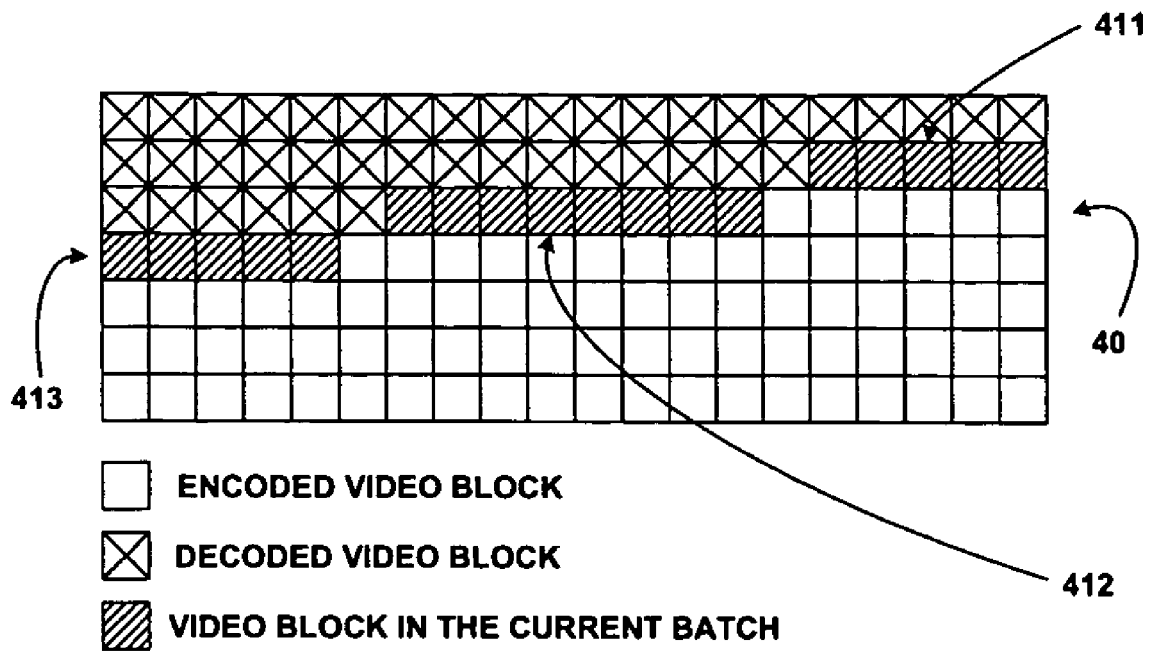
Figure 4H:
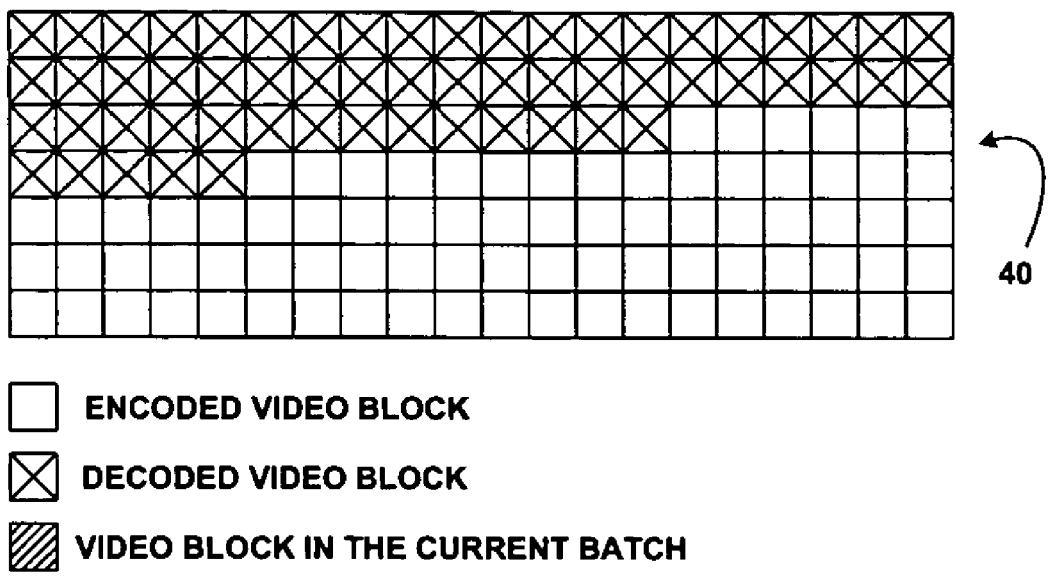
Figure 4I:
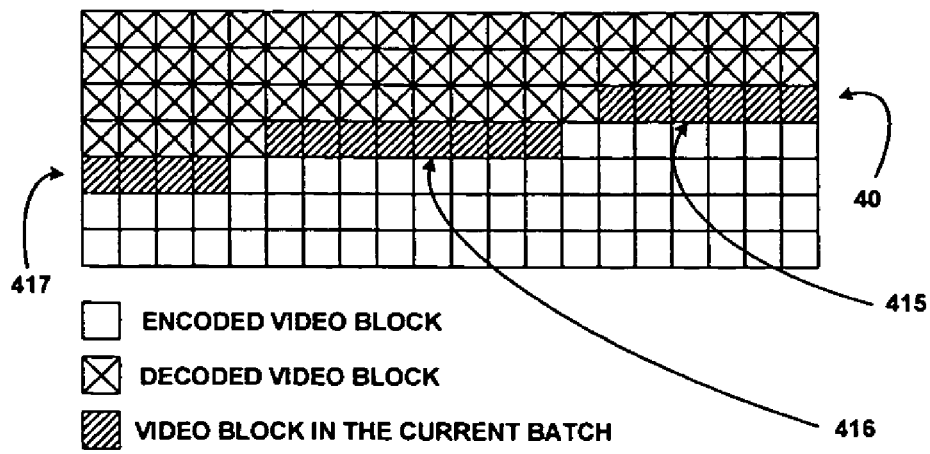
Figure 4J:
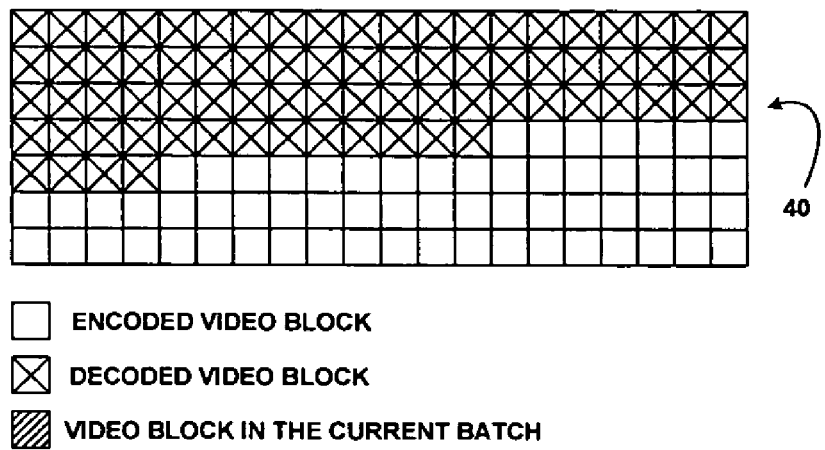
Figure 4K:
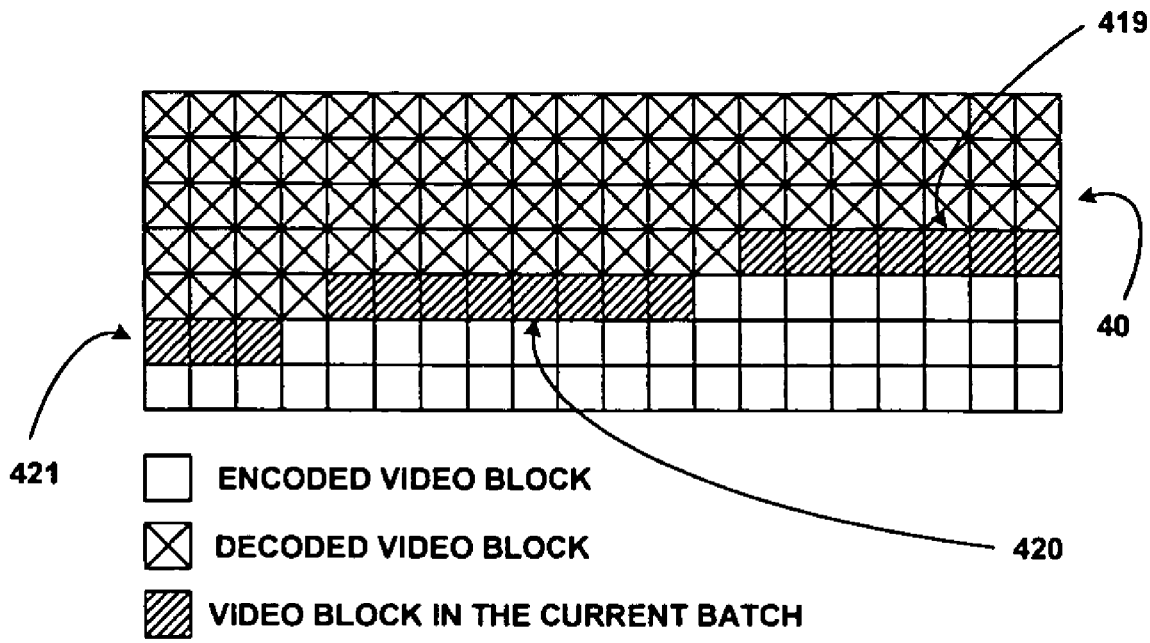
Figure 4L:
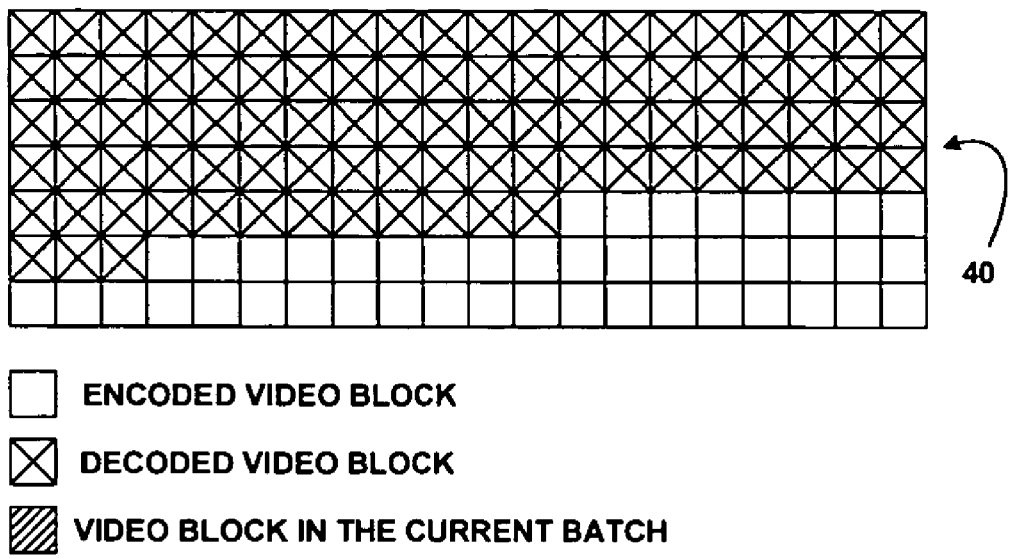
Figure 4M:
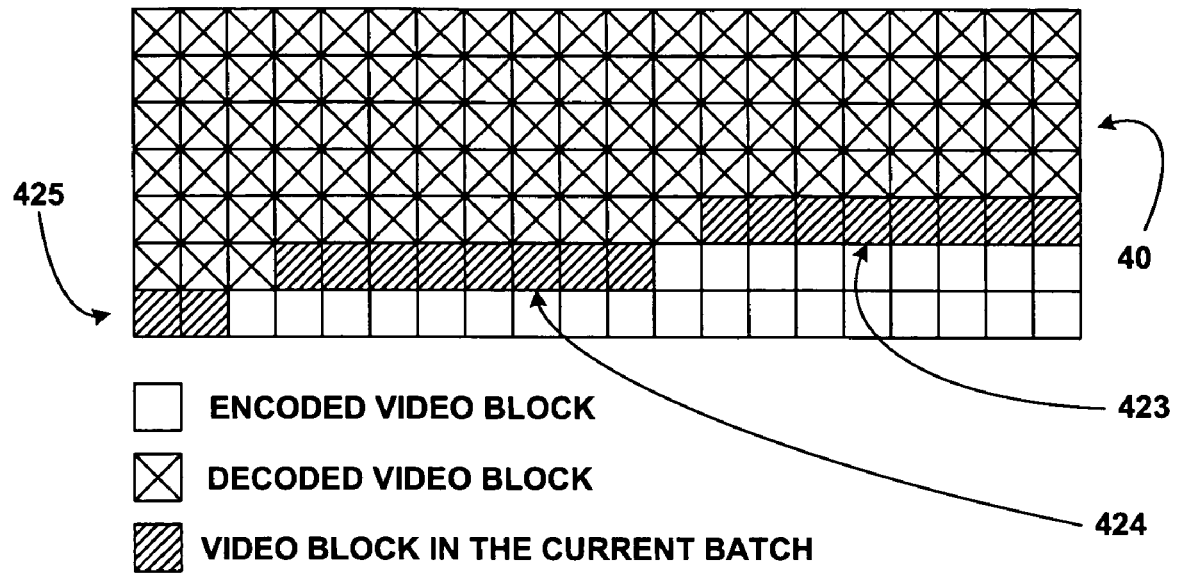
Figure 4N:
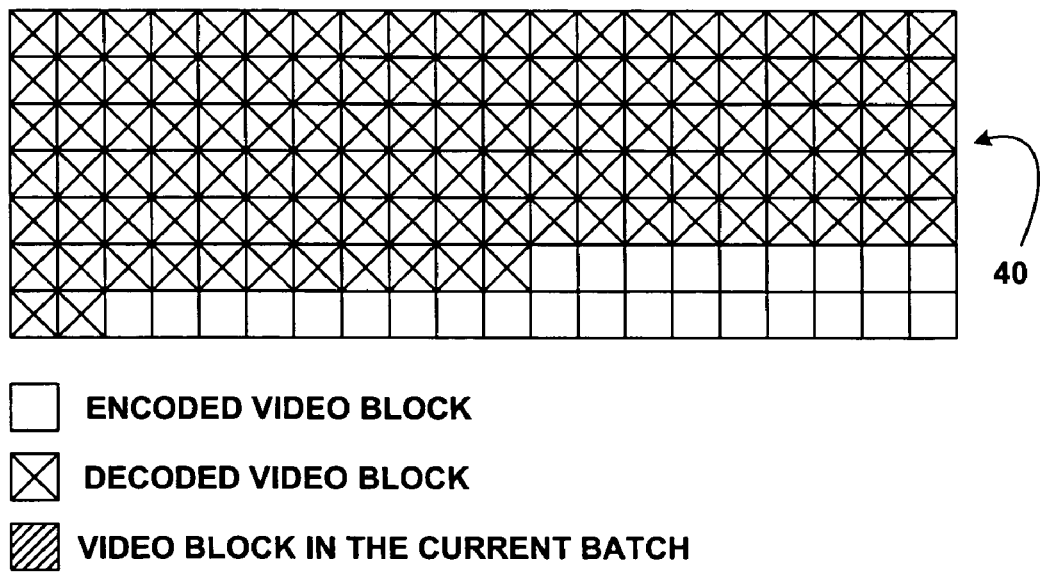
Figure 4O:
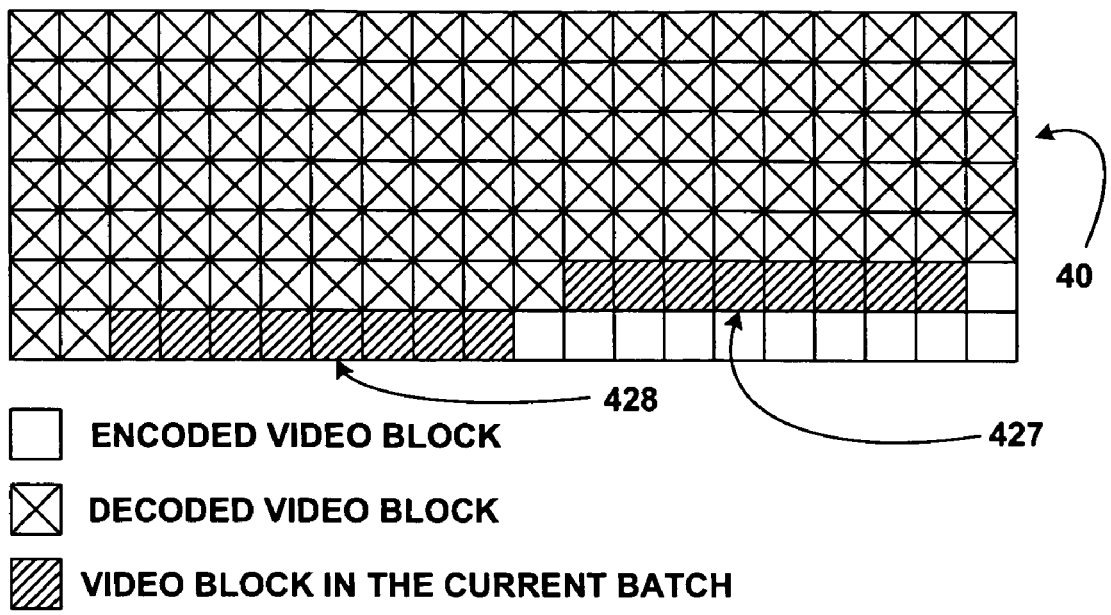
Figure 4P:
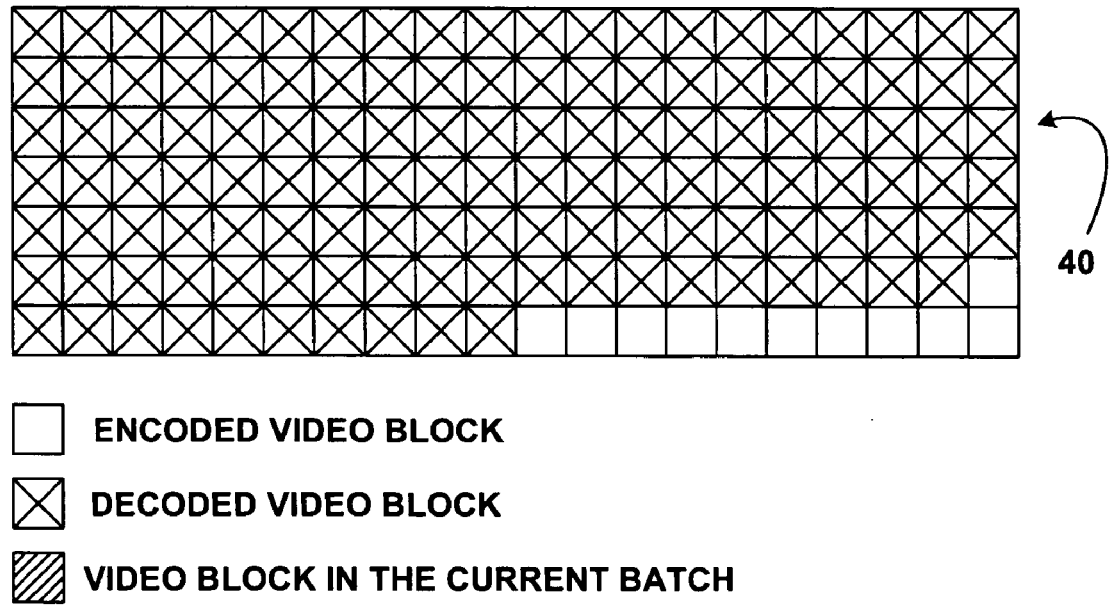
Figure 4Q:
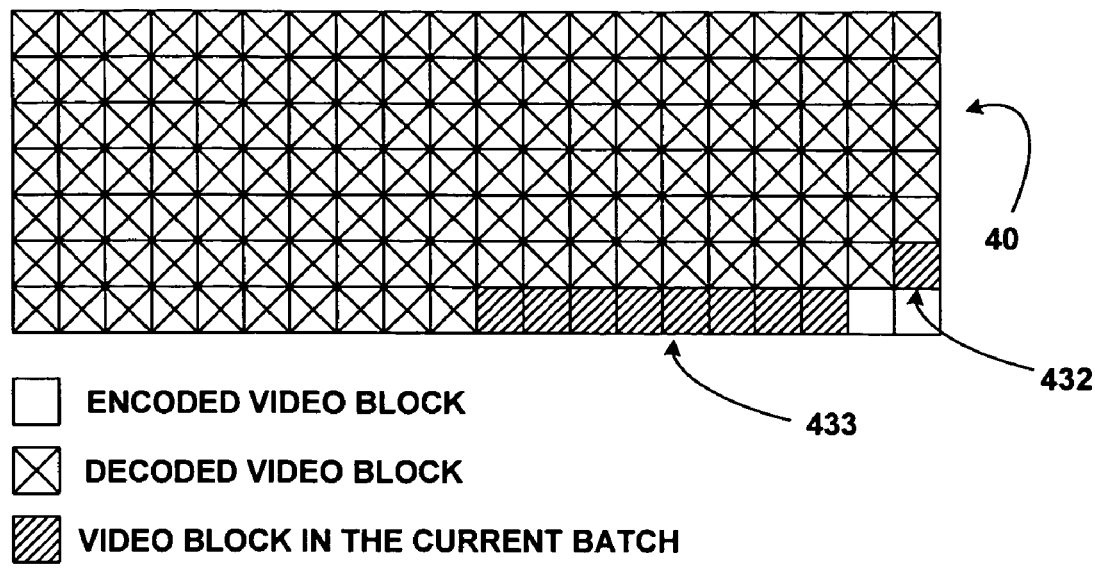
Figure 4R:
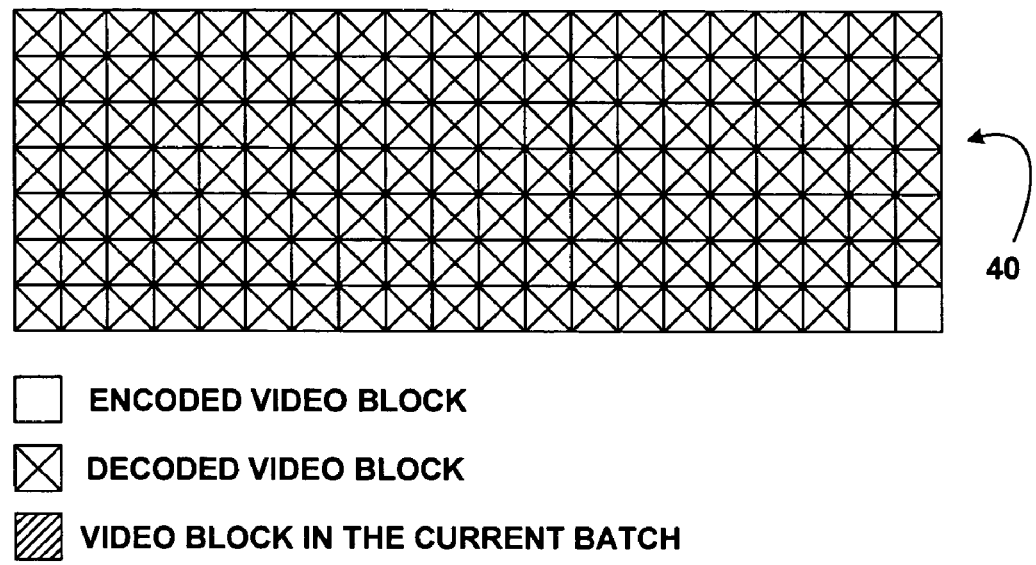
Figure 4S:
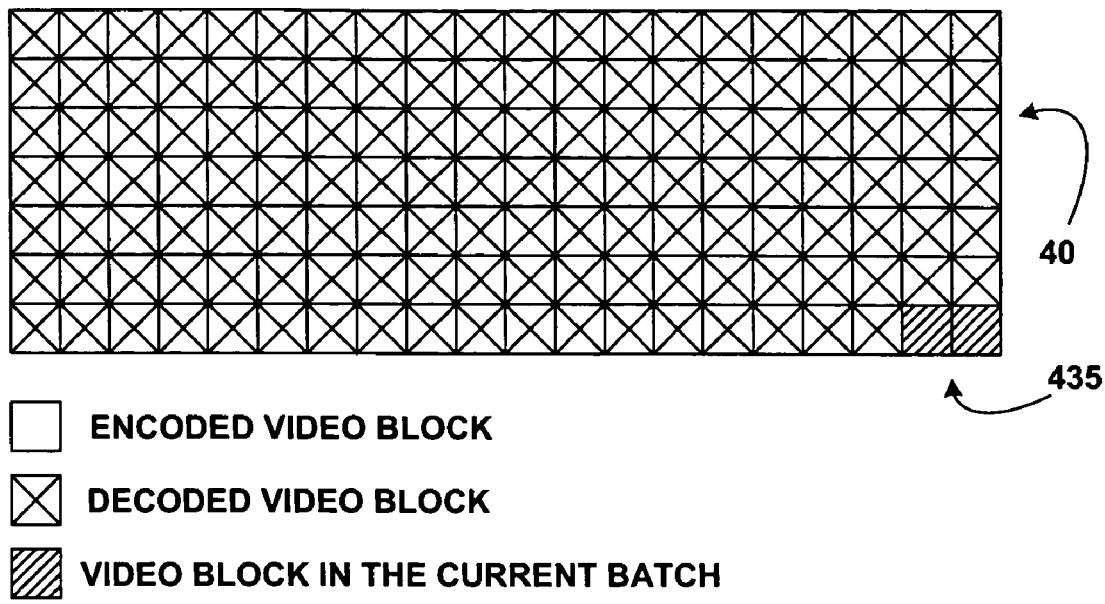
Figure 4T:
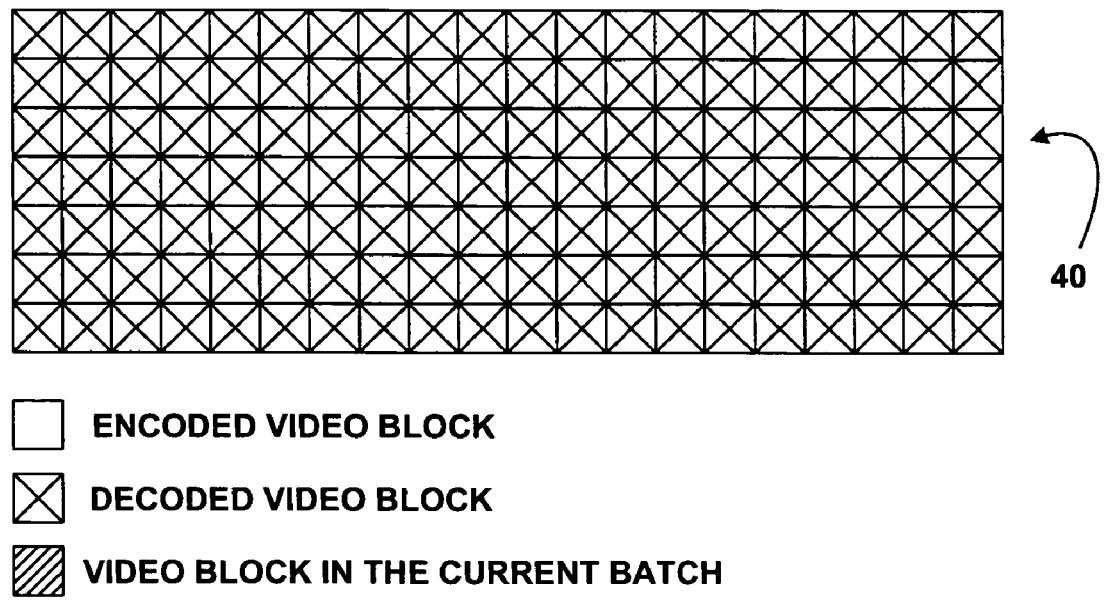

FIGS. 4A-4T are a series of conceptual diagrams illustrating a decoding process that includes defining batches of video blocks of an image frame, and decoding the video blocks of various batches in parallel with one another. Each of FIGS. 4A-4T illustrate an exemplary image frame 40 at various stages of the decoding process. In this relatively simple example, the number of batches is limited to three. There is no minimum on the number of video blocks per batch, but the maximum is defined as 8 video blocks per batch.

The relatively simple example of FIGS. 4A-4T can be understood best based on synchronous decoding. In this case, sets of batches are defined with each iteration of the process, and all of the batches are completed before a new set of batches are defined. More preferably, however, asynchronous decoding may be used, in which case a new batch may be defined any time for a respective processing thread, whenever the thread becomes available and the necessary information for video blocks is available to define the batch. The synchronous illustration of FIGS. 4A-4T, however, provides insight to the advantages of parallel decoding, even thought more efficiency can be achieved with an asynchronous process.

Each of FIGS. 4A-4T include a key that defines encoded video blocks within image frame 40, decoded video blocks within image frame 40 and those video blocks defined in a current batch. Although the video blocks illustrated in FIGS. 4A-4T all have similar sizes, the techniques of this disclosure are not limited in this respect. In other words, the different video blocks could have different sizes, e.g., in accordance with the ITU H.264 standard or other standards that allow for sub-division of macroblocks or generally allow for different sized video blocks.

In FIG. 4A, all of the video blocks of image frame 40 are encoded video blocks. At this point in the decoding process, batch decode control unit 35 defines a first batch as shown in FIG. 4B. The first batch 401 includes eight video blocks. The video blocks of batch 401 are decoded in a serial fashion by virtual processor 38A, and therefore, become decoded video blocks, as shown in FIG. 4C.

Following the decode of first batch 401, batch decode control unit defines additional batches as shown in FIG. 4C. The batches of FIG. 4C includes a two batches 402 and 403 that include eight video blocks and seven video blocks respectively. Batch 402 is a set of video blocks on the same row as batch 401, while batch 403 is a set of video blocks on the next row below batch 401 Referring again to FIG. 2 and the discussion above with respect to the information needed to ensure that a decode is possible even if video blocks are intra-coded, it should be apparent that since batch 401 is decoded, all information is available to decode the batches 402 and 403. In particular, the first video block in each of batches 402 and 403 has decoded video blocks in the adjacent locations where intra-coding could depend.

The video blocks of batches 402 and 403 are each decoded in a serial fashion by different virtual processors 38A and 38B. Moreover, the decoding of batches 402 and 403, while serial with respect to the video blocks of the respective batches, is parallel with respect to each other. In other words, batch 402 is decoded serially by virtual processor 38A while batch 402 is decoded serially by virtual processor 38B. FIG. 4D illustrates image frame 40 following the decode of all of the video blocks in batches 402 and 403.

Next, batch decode control unit 35 defines more batches as shown in FIG. 4E. In particular, FIG. 4E shows three batches 405, 406 and 407. Batch 405 includes four video blocks, Batch 406 includes eight video blocks, and batch 407 includes six video blocks. Each of batches 405, 406 and 407 include contiguous video blocks, yet the video blocks of the different batches are non-contiguous with one another. Each of batches 405, 406 and 407 reside in different video block rows of the image frame.

For the set of batches shown in FIG. 4E, all the information needed to ensure successful decode of the different batches is present at the time batches 405, 406 and 407 are defined. The video blocks of batches 405, 406 and 407 are each decoded in a serial fashion by different virtual processors 38A, 38B and 38N. Moreover, the decoding of batches 405, 406 and 407, while serial with respect to the video blocks within the respective batches, is parallel with respect to the video blocks in different batches. In other words, batch 405 is decoded serially by virtual processor 38A, while batch 406 is simultaneously decoded serially by virtual processor 38B, and while batch 407 is simultaneously decoded serially by another virtual processor, such as processor 38N. FIG. 4F illustrates image frame 40 following the decode of all of the video blocks in batches 405, 406 and 407.

FIG. 4G illustrates another set of batches, which are defined by batch decode control unit 35. In this example, three more batches are defined, i.e., batch 411, batch 412 and batch 413. These video blocks of these different batches are processed serially by different ones of processors 38 and in parallel with respect to one another. FIG. 4H illustrates image frame 40 following the decode of all of the video blocks in batches 411, 412 and 413.

FIG. 4I illustrates another set of batches, which may be defined by batch decode control unit 35. In this example, three more batches exist, i.e., batch 415, batch 416 and batch 417. These video blocks of these different batches are processed serially by different ones of processors 38 and in parallel with respect to one another. FIG. 4J illustrates image frame 40 following the decode of all of the video blocks in batches 415, 416 and 417.

FIG. 4K illustrates another set of batches, which is defined by batch decode control unit 35. In this example, three new batches exist, i.e., batch 419, batch 420 and batch 421. These video blocks of these different batches are processed serially by different ones of processors 38 and in parallel with respect to one another. FIG. 4L illustrates image frame 40 following the decode of all of the video blocks in batches 419, 420 and 421.

FIG. 4M illustrates additional batches, which can be defined by batch decode control unit 35. In this example, three more batches are defined, i.e., batch 423, batch 424 and batch 425. These video blocks of these different batches are processed serially by different ones of processors 38 and in parallel with respect to one another. FIG. 4N illustrates image frame 40 following the decode of all of the video blocks in batches 423, 424 and 425.

FIG. 4O illustrates additional batches, which can be defined by batch decode control unit 35. Unlike the previous sets of batches, FIG. 4O only illustrates two batches, i.e., batch 427 and batch 428. This is because the process is nearing the end of image frame 40. The process generally builds up the number of batches in the first few iterations, maintains the maximum number of batches for middle iterations and then reduces the number of batches for the final iterations. In any case, like the other iterations, the video blocks of these different batches 427 and 428 are processed serially by different ones of processors 38 and in parallel with respect to one another. FIG. 4P illustrates image frame 40 following the decode of all of the video blocks in batches 427 and 428.

FIG. 4Q illustrates another set of batches, which may be defined by batch decode control unit 35. In this example, two more batches are shown, i.e., batch 432 and batch 433. These video blocks of these different batches are processed serially by different ones of processors 38 and in parallel with respect to one another. FIG. 4R illustrates image frame 40 following the decode of all of the video blocks in batches 432 and 433.

FIG. 4S illustrates a final batch 435, which is defined by batch decode control unit 35. Thus, the first and last batches of the process are decoded alone. The processing efficiency associated with the use of multiple processors (or multiple threads) is gained in the processing of two or more batches at the same time With respect to the final batch 435, processor 38A processes the video blocks in serial. FIG. 4T illustrates the fully decoded image frame 40, following the decode of all of the video blocks in the final batch 435.

Although the example illustration of FIGS. 4A-4T only increase the number of batches to a maximum of three, this disclosure is not so limited. Indeed, the maximum number of batches could be much larger, particularly for images that have significantly more video blocks per row. Each iteration may add an additional batches until the maximum is achieved or the number of video blocks in a given row limit the batches due to insufficient decoded video blocks that may define intra-dependency.

In the illustrations of FIGS. 4A-4T, each respective batch is defined to ensure that a serial decode of that batch will also ensure that all video blocks of the batch can be decoded. In some cases, however, batches could be defined larger, based on a presumption that other batches will be decoded in parallel. For example, referring to FIG. 4G, batch 413 could be defined to include additional video blocks based on the presumption that the first few video blocks of batch 412 will be decoded before the last (additional) video blocks of batch 413 are decoded. Thus, batch 413 could be defined to include one or more video blocks that cannot be decoded until one or more video blocks of batch 412 are decoded. If parallel decoding of batches 412 and 413 is assumed and anticipated, the process can still work even with added video blocks to batch 413, and such added video blocks to batch 413 may provide even more efficiency.

Also, the relatively simple example of FIGS. 4A-4T involves synchronous decoding, in which sets of batches are defined with each iteration of the process, and all of the batches are completed before a new set of batches are defined. More preferably, however, asynchronous decoding may be used, in which case a new batch may be defined any time a processing thread is available and the necessary information for video blocks is available to define the batch. In other words, according to this disclosure, batch decode control unit 35 can define another batch for first virtual processor 38A (first thread) upon finishing the decoding of the current batch by that virtual processor 38A, and independently define another batch for a second virtual processor 38B (first thread) upon finishing the decoding of its current batch. In this manner, any given thread can be delivered a new batch upon finishing its current batch, as long as the necessary information for video blocks is available to define a new batch. Therefore, each of the batches is defined when one of the threads is available to perform decoding and all necessary information is available for a set of contiguous video blocks.

Figure 5:
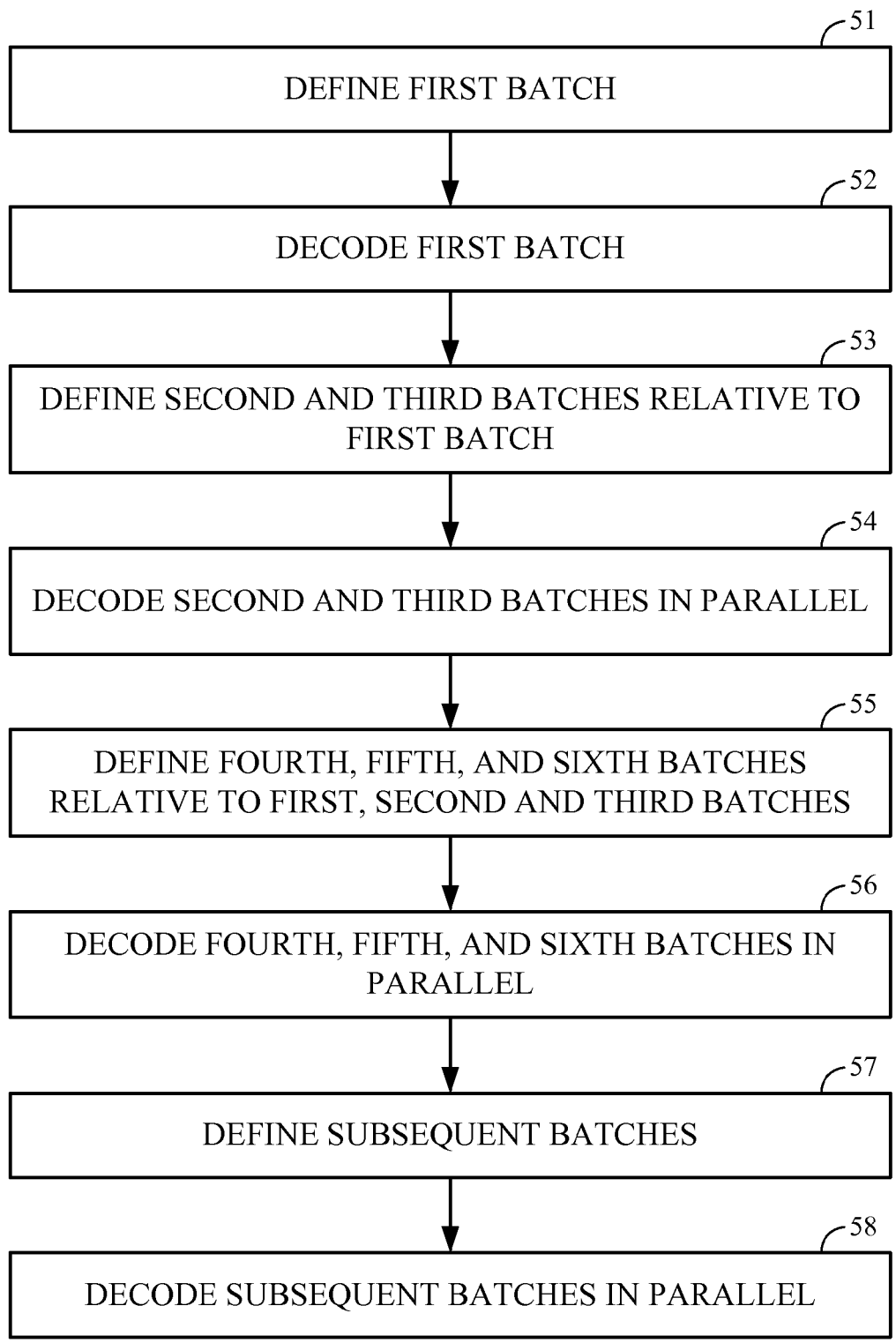
FIG. 5 is a flow diagram illustrating a decoding technique according to an embodiment of this disclosure.

FIG. 5 is a flow diagram illustrating a decoding technique according to an embodiment of this disclosure. As shown in FIG. 5, batch decode control unit 35 defines a first batch (51), and a given one of processors 38 decodes the first batch (52). Next, batch decode control unit 35 defines second and third batches (53). Different ones of processors 38 decode the second and third batches in parallel (54).

Next, batch decode control unit 35 defines forth, fifth, and sixth batches (55) relative to the first second and third batches, and different ones of processors 38 decode the different batches in parallel (56). Batch decode control unit 35 then defines subsequent batches (57), and different ones of processors 38 decode the different batches parallel (58). Each of the batches are processed serially by each processor, yet in parallel with respect to other batches. Any given batch is defined when a given one of processors 38 is available, and sufficient information is also available to defined a batch. Thus, the fourth, fifth, and sixth batches may not be defined simultaneously, but rather, may be respectively defined as soon as possible, e.g., when one of processors 38 is available, and sufficient information is also available to defined the respective batch. At the beginning of the process, a single batch is defined, but after the decode of that first batch, two or more batches can be defined. As more and more batches are decoded, the ability to define new batches is increased.

The process of FIG. 5 may continue indefinitely until all of the video blocks of an image frame are decoded. As the process nears the end of an image frame, few batches may be defined for parallel decode. The first and last batch of any given image frame may be decoded alone, without being decoded in parallel with other batches, while all other batches of an image frame may be decoded in parallel with one or more other batches. Each respective batch may be defined asynchronously and independently of other batches, or sets of batches may be defined in a synchronous manner.

Furthermore, the process of FIG. 5 can be repeated for successive image frames that form a video sequence. The maximum number of batches that can be defined may become significantly large for image frames that have significantly more video blocks per row. As the process unfolds, additional batches may be defined for parallel decode until the maximum is achieved (e.g., limited to the number of virtual processors or threads). In some cases, the number of video blocks in a given row can limit the batches due to insufficient decoded video blocks that may define intra-dependency. The process may build up the number of batches to be decoded in parallel, maintain the maximum number of batches decoded in parallel, and then reduce the number of batches decoded in parallel as the process approaches the end of an image frame. The first and final batches for each image frame may be decoded at least partially by themselves, while all other batches are decoded along with other batches.

A number of embodiments have been described. However, various modifications could be made to the techniques described herein without departing from the spirit and scope of the appended claims. The techniques described herein may be implemented in hardware, software, firmware, or any combination thereof. If implemented in software, the techniques also may be embodied by a computer-readable medium comprising program code, that when executed in a device, performs one or more of the decoding techniques described herein. In that case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer-readable instructions. In that case, a processor such as a DSP may execute instructions stored in memory in order to carry out one or more of the decoding techniques. In some cases, the techniques may be executed by a DSP that invokes various hardware components to accelerate the decoding process. In other cases, the units described herein may be implemented as a microprocessor, one or more application specific integrated circuits (ASICs), one or more field programmable gate arrays (FPGAs), or some other hardware-software combination. These and other embodiments are within the scope of the following claims.

The invention claimed is:

1. A method that decodes image frames of a video sequence, the method comprising:
    defining a first batch of video blocks of an image frame;
    decoding the first batch of video blocks in a serial manner;
    defining a second batch of video blocks and a third batch of video blocks relative to the first batch of video blocks, wherein the first video block in each of the second and third batches has decoded video blocks in adjacent locations of the first batch of video blocks where intra-coding could depend; and
    decoding the second and third batches of video blocks in parallel with one another,
    wherein defining the first, second, and third batches comprises defining parameters of the first, second, and third batches,
    wherein for each respective batch, defining parameters includes defining a column within the image frame, defining a row within the image frame, and defining a number of contiguous video blocks for the respective batch.

2. The method of claim 1, wherein decoding the second and third batches includes decoding the second and third batches with parallel processes.

3. The method of claim 2, wherein decoding the second and third batches with parallel processes includes using two or more different processors.

4. The method of claim 2, wherein decoding the second and third batches of video blocks in parallel includes:
    decoding the second batch in a serial manner using a first thread of a multi-threaded processor; and
    decoding the third batch in a serial manner using a second thread of the multi-threaded processor.

5. The method of claim 4, further comprising
    defining another batch for the first thread upon finishing the decoding of the second batch; and
    defining another batch for the second thread upon finishing the decoding of the third batch.

6. The method of claim 5, wherein a respective batch is defined when one of the first and second threads is available to perform decoding and all necessary information is available for a set of contiguous video blocks.

7. The method of claim 4, further comprising:
defining fourth, fifth and sixth batches of video blocks relative to the first, second, and third batches of video blocks; and
decoding the fourth, fifth and sixth batches of video blocks in parallel.

8. The method of claim 7, wherein decoding the fourth, fifth, and sixth batches of video blocks in parallel includes:
decoding the fourth batch in a serial manner using the first thread of the multi-threaded processor;
decoding the fifth batch in a serial manner using the second thread of the multi-threaded processor; and
decoding the sixth batch in a serial manner using a third thread of the multi-threaded processor.

9. The method of claim 1, wherein:
all video blocks of the first batch are contiguous within the image frame;
all video blocks of the second batch are contiguous within the image frame;
all video blocks of the third batch are contiguous within the image frame; and
the video blocks of the second batch are non-contiguous with the video blocks of the third batch.

10. The method of claim 1, further comprising defining successive batches and decoding the successive batches for all of the video blocks of an image frame of video sequence.

11. A non-transitory computer-readable medium comprising instructions that upon execution in a video coding device cause the device to:
define a first batch of video blocks of an image frame;
decode the first batch of video blocks in a serial manner;
define a second batch of video blocks and a third batch of video blocks relative to the first batch of video blocks, wherein the first video block in each of the second and third batches has decoded video blocks in adjacent locations of the first batch of video blocks where intra-coding could depend; and
decode the second and third batches of video blocks in parallel with one another,
wherein defining the first, second, and third batches comprises defining parameters of the first, second, and third batches,
wherein for each respective batch, defining parameters includes defining a column within the image frame, defining a row within the image frame, and defining a number of contiguous video blocks for the respective batch.

12. The computer-readable medium of claim 11, wherein upon execution the instructions:
decode the second batch in a serial manner using a first thread of a multi-threaded processor; and
decode the third batch in a serial manner using a second thread of the multi-threaded processor.

13. The computer-readable medium of claim 12, wherein upon execution the instructions
define another batch for the first thread upon finishing the decode of the second batch; and
define another batch for the second thread upon finishing the decode of the third batch.

14. The computer-readable medium of claim 13, wherein a respective batch is defined when one of the first and second threads is available to perform decoding and all necessary information is available for a set of contiguous video blocks.

15. The computer-readable medium of claim 12, wherein upon execution the instructions:
define fourth, fifth and sixth batches of video blocks relative to the first second and third batches of video blocks; and
decode the fourth, fifth and sixth batches of video blocks in parallel.

16. The computer-readable medium of claim 15, wherein upon execution the instructions:
decode the fourth batch in a serial manner using the first thread of the multi-threaded processor;
decode the fifth batch in a serial manner using the second thread of the multi-threaded processor; and
decode the sixth batch in a serial manner using a third thread of the multi-threaded processor.

17. The computer-readable medium of claim 11, wherein:
all video blocks of the first batch are contiguous within the image frame;
all video blocks of the second batch are contiguous within the image frame;
all video blocks of the third batch are contiguous within the image frame; and
the video blocks of the second batch are non-contiguous with the video blocks of the third batch.

18. The computer-readable medium of claim 11, wherein upon execution the instructions define successive batches and decode the successive batches for all of the video blocks of an image frame of a video sequence.

19. A device that decodes image frames of a video sequence, the device comprising:
a decode control unit that defines a first batch of video blocks of an image frame, and defines second and third batches of video blocks relative to the first batch of video blocks, wherein the first video block in each of the second and third batches has decoded video blocks in adjacent locations of the first batch of video blocks where intra-coding could depend; and
one or more processors that decode the first batch of video blocks in serial manner and decode the second and third batches of video blocks in parallel with one another,
wherein the decode control unit defines the first, second, and third batches by defining parameters of the first, second, and third batches,
wherein for each respective batch, the decode control unit defines a column within the image frame, defines a row within the image frame, and defines a number of contiguous video blocks.

20. The device of claim 19, wherein the one or more processors comprise a digital signal processor (DSP) that executes a plurality of parallel threads, wherein the DSP:
decodes the second batch in a serial manner using a first thread of the DSP; and
decodes the third batch in a serial manner using a second thread of the DSP.

21. The device of claim 19, wherein the decode control unit:
defines another batch for the first thread upon finishing the decode of the second batch; and
defines another batch for the second thread upon finishing the decode of the third batch.

22. The device of claim 21, wherein the decode control unit defines a respective batch when one of the first and second threads is available to perform decoding and all necessary information is available for a set of contiguous video blocks.

23. The device of claim 20, wherein:
the decode control unit defines fourth, fifth and sixth batches of video blocks relative to the first second and third batches of video blocks; and the DSP decodes the fourth, fifth and sixth batches of video blocks in parallel.

24. The device of claim 23, wherein the DSP:
decodes the fourth batch in a serial manner using the first thread;
decodes the fifth batch in a serial manner using the second thread; and
decodes the sixth batch in a serial manner using a third thread.

25. The device of claim 19, wherein:
all video blocks of the first batch are contiguous within the image frame;
all video blocks of the second batch are contiguous within the image frame;
all video blocks of the third batch are contiguous within the image frame; and
the video blocks of the second batch are non-contiguous with the video blocks of the third batch.

26. The device of claim 19, wherein the decode control unit defines successive batches and the one or more processors decode the successive batches for all of the video blocks of an image frame of the video sequence.

27. A device that decodes image frames of a video sequence, wherein the device:
defines a first batch of video blocks of an image frame;
decodes the first batch of video blocks in a serial manner;
defines a second batch of video blocks and a third batch of video blocks relative to the first batch of video blocks, wherein the first video block in each of the second and third batches has decoded video blocks in adjacent locations of the first batch of video blocks where intra-coding could depend; and
decodes the second and third batches of video blocks in parallel with one another,
wherein defining the first, second, and third batches comprises defining parameters of the first, second, and third batches,
wherein for each respective batch, defining parameters includes defining a column within the image frame, defining a row within the image frame, and defining a number of contiguous video blocks for the respective batch.

28. The device of claim 27, wherein the device:
decodes the second batch in a serial manner using a first thread of a multi-threaded processor; and
decodes the third batch in a serial manner using a second thread of the multi-threaded processor.

29. The device of claim 28, wherein the device
defines another batch for the first thread upon finishing the decoding of the second batch; and
defines another batch for the second thread upon finishing the decoding of the third batch, wherein a respective batch is defined when one of the first and second threads is available to perform decoding and all necessary information is available for a set of contiguous video blocks.

30. A device that decodes image frames of a video sequence, the device comprising:
means for defining a first batch of video blocks of an image frame;
means for decoding the first batch of video blocks in a serial manner;
means for defining a second batch of video blocks and a third batch of video blocks relative to the first batch of video blocks, wherein the first video block in each of the second and third batches has decoded video blocks in adjacent locations of the first batch of video blocks where intra-coding could depend; and
means for decoding the second and third batches of video blocks in parallel with one another,
wherein the means for defining the first, second, and third batches is configured to define parameters of the first, second, and third batches,
wherein for each respective batch, defining parameters includes defining a column within the image frame, defining a row within the image frame, and defining a number of contiguous video blocks for the respective batch.

* * * * *